(12) United States Patent
Lee et al.

(10) Patent No.: US 6,622,258 B1
(45) Date of Patent: Sep. 16, 2003

(54) DATA PROTECTION IN A RING NETWORK

(75) Inventors: Charles Lee, Ashland, MA (US); Ray Paradiso, Acton, MA (US); Jonathan Morgan, Groton, MA (US)

(73) Assignee: Appian Communications, Inc., Acton, MA (US)

( * ) Notice: Subject to any disclaimer, the term of this patent is extended or adjusted under 35 U.S.C. 154(b) by 0 days.

(21) Appl. No.: 09/546,035

(22) Filed: Apr. 10, 2000

(51) Int. Cl.$^7$ ................................................ G06F 11/00
(52) U.S. Cl. ........................... 714/4; 370/223; 370/224
(58) Field of Search ............................. 714/4, 43, 717, 714/716; 370/224, 223, 222

(56) References Cited

U.S. PATENT DOCUMENTS

| | | | |
|---|---|---|---|
| 4,190,821 A | * 2/1980 | Woodward | 714/4 |
| 4,542,496 A | * 9/1985 | Takeyama et al. | 370/224 |
| 4,633,246 A | 12/1986 | Jones et al. | 340/825.05 |
| 4,648,088 A | * 3/1987 | Cagle et al. | 370/224 |
| 4,769,807 A | * 9/1988 | Niwa et al. | 370/224 |
| 4,815,069 A | * 3/1989 | Nakayashiki et al. | 370/224 |
| 5,040,170 A | * 8/1991 | Upp et al. | 359/135 |
| 5,159,595 A | * 10/1992 | Flanagan et al. | 370/224 |
| 5,307,353 A | * 4/1994 | Yamashita et al. | 714/4 |
| 5,442,620 A | * 8/1995 | Kremer | 370/224 |
| 5,499,275 A | * 3/1996 | Kishi | 375/357 |
| 5,721,727 A | 2/1998 | Ashi et al. | 370/244 |
| 6,233,704 B1 | * 5/2001 | Scott et al. | 714/717 |
| 6,269,452 B1 | * 7/2001 | Daruwalla et al. | 714/4 |
| 6,275,510 B1 | * 8/2001 | Koenig et al. | 370/535 |
| RE37,401 E | * 10/2001 | Yamashita et al. | 714/717 |
| 6,430,700 B1 | * 8/2002 | Daruwalla et al. | 714/4 |
| 6,538,987 B1 | * 3/2003 | Cedrone et al. | 370/216 |

FOREIGN PATENT DOCUMENTS

| | | | | |
|---|---|---|---|---|
| EP | 456206 A2 | 11/1991 | | |
| EP | 744845 A2 | 5/1996 | | |
| EP | 804001 A2 | 4/1997 | | |
| JP | 57212848 A | * 12/1982 | | 714/FOR 291 |
| JP | 01296836 A | * 11/1989 | | 370/249 |

OTHER PUBLICATIONS

"Recommended Practice for Dual Ring Operaytion with Wrapback Reconfiguration" IEEE Std 802.5c–1991, IEEE Standards Board.*

* cited by examiner

Primary Examiner—Robert Beausoliel
Assistant Examiner—Gabriel L Chu
(74) Attorney, Agent, or Firm—Hale & Dorr LLP

(57) ABSTRACT

A method for reconfiguring a ring of nodes connected by a working fiber and a protection fiber upon disruption of the signal in either the working fiber or the protection fiber includes signaling the other nodes. Each node determines whether it is a node adjacent to the disruption. Those nodes that are not adjacent to the disruption undergo no change in their operation. A receiving node adjacent to the disruption forms a bridge isolating the disruption and sends an acknowledgement signal back to a signaling node. Upon receipt of the acknowledgement signal, the signaling node also forms a bridge. This results in the isolation of that portion of the ring having a disruption and the formation of a new ring.

31 Claims, 9 Drawing Sheets

DATA PROTECTION IN A RING NETWORK

This invention relates to communication networks, and in particular, to methods and systems for ensuring the integrity of data transmission in the event of an equipment failure within the network.

BACKGROUND

A communication network typically includes a large number of nodes connected by transmission lines. In a modem network, these transmission lines are often optical fibers. Such fibers are extremely thin and therefore susceptible to mechanical breakage. In addition, because fibers are so thin, the alignment between fibers at a junction must be extremely precise. These junctions are therefore easily disrupted by mechanical shock or vibration. Even slight kinks or bends in a fiber can cause internal reflections that lead to significant degradation in signal quality.

Although every attempt is made to isolate a fiber from mechanical disturbance, it is difficult to reliably do so. Buried fibers routinely fall prey to backhoes in construction accidents. Over the years, the accumulated effect of the vibration of passing subway trains can gradually degrade communication. Not all disruptions result from human activity, however. Even a minor earthquake can cause isolated disruptions in service.

A network can also fail as a result of disruption within a node. For example, the laser at the transmitting end of each fiber can gradually deteriorate. Since nodes can include complex electronic systems, they too are subject to failure from a variety of causes.

To avoid excessive service disruption in the event of network failure, it is desirable to provide the network with redundancy. One method of achieving this is to arrange the nodes of a communication network in a ring and to connect the nodes with both two independent fibers: a working fiber and a protection fiber. A ring connected in this way is referred to in the art as a UPSR (Unidirectional Path Switched Ring).

In a UPSR, a source node transmits two copies of a data frame to a destination node. A working copy of the data frame travels clockwise around the ring on the working fiber and a protection copy of the frame travels counter-clockwise around the ring on the protection fiber. If the destination node finds that the protection copy matches the working copy, it accepts the working copy. Otherwise, the destination node selects the better of the two copies.

As it makes its way to the destination node from the source node, a data frame can pass through many other nodes. In these intervening nodes, there may be data packets queued for transmission on the ring. In addition, there may be space within the data frame for accommodating some of these data packets. Because these empty spaces represent a waste of network resources, it would be useful to accommodate some of these queued data packets in those spaces.

Unfortunately, as soon as the data frame accepts a data packet from a node other than the source node, the working copy of the data frame will inevitably differ from the protection copy of the frame. Thus, upon comparing the working copy with the protection copy, the destination node will receive two different frames with no way to determine whether the difference is the result of additional data on the frame or a disruption in transmission.

SUMMARY

A communication network according to the invention circumvents the foregoing difficulties by providing nodes that do not rely on a comparison between two copies of a data frame in order to detect the existence of an error. Instead, each node adopts a signaling protocol that informs all the other nodes in the network of the condition of the signals arriving at that node from an adjacent node. In response to these signals, each node makes an independent decision as to whether to bypass its adjacent nodes on the network.

The communication network provides a method for reconfiguring a ring having a plurality of nodes connected by first and second channels. Examples of such rings include SONET (Synchronous Optical Network) rings and WDM (Wavelength Division Multiplexing) rings.

When a disruption occurs, there will be a first node and a second node adjacent to, and on either side of, the disruption. Upon the detection of the disruption, the first node signals each of the other nodes to cause that other node to determine if it is the second node, and, if so, to identify itself as such. If it is not, that node continues to operate in its normal mode. However, if that node determines that it is the second node, it sends an acknowledgement signal back toward the first node and forms a bridge between the first and second channels, thereby preventing data from proceeding further toward the disruption. Upon receipt of the acknowledgement, the first node likewise forms a bridge between the first and second channels, thereby preventing data from proceeding further toward the disruption. This results in the isolation of that disruption and the combination of the first and second channels to form a new ring that excludes the disruption.

In one aspect of the invention, the first node sends, by way of the first channel, a first fault signal indicative of a signal fault on the first channel. A second node monitors the second channel for information indicative of the signal fault. On the basis of this information and the first fault signal, the second node forms a first bridge and thereby disconnects a portion of the ring. In addition, the second node sends an acknowledgement signal, by way of the second channel, to the first node.

The information indicative of the signal fault can be a second fault signal. However, it can also be loss of signal on the second channel. This feature permits the data protection to function correctly when both the working channel and the protection channel are disrupted.

In response to the acknowledgement signal, the first node forms a second bridge, thereby disconnecting another portion of the ring. This results in a reconfigured ring in which no signal faults are present in either the first or the second channel.

In a typical communication network, there can be several intervening nodes on the first and second channels connecting the first node and the second node. The method of the invention can thus include routing the acknowledgement signal through a third node selected from the plurality of nodes forming the network.

Forming the first bridge can include directing data traffic arriving at the first node by way of the second channel out through the first channel. This is preferably accompanied by forming the second bridge by directing inbound traffic arriving at the second node outbound on the second fiber.

The method can also include detecting a signal fault on the first channel. The signal fault can be a loss of a signal on the first channel or a degradation of the signal on the first channel. The degradation of the signal can be manifested by an increase in the bit error rate of the signal on the first channel.

The fault signal is typically sent as part of the frame overhead for the protocol used on the ring. For example, in the case of a SONET ring, the fault signal is encoded on either the V4 byte or the Z4 byte.

These and other features of the invention will be apparent upon review of the following detailed description and the accompanying figures in which:

DETAILED DESCRIPTION

Figure 1:
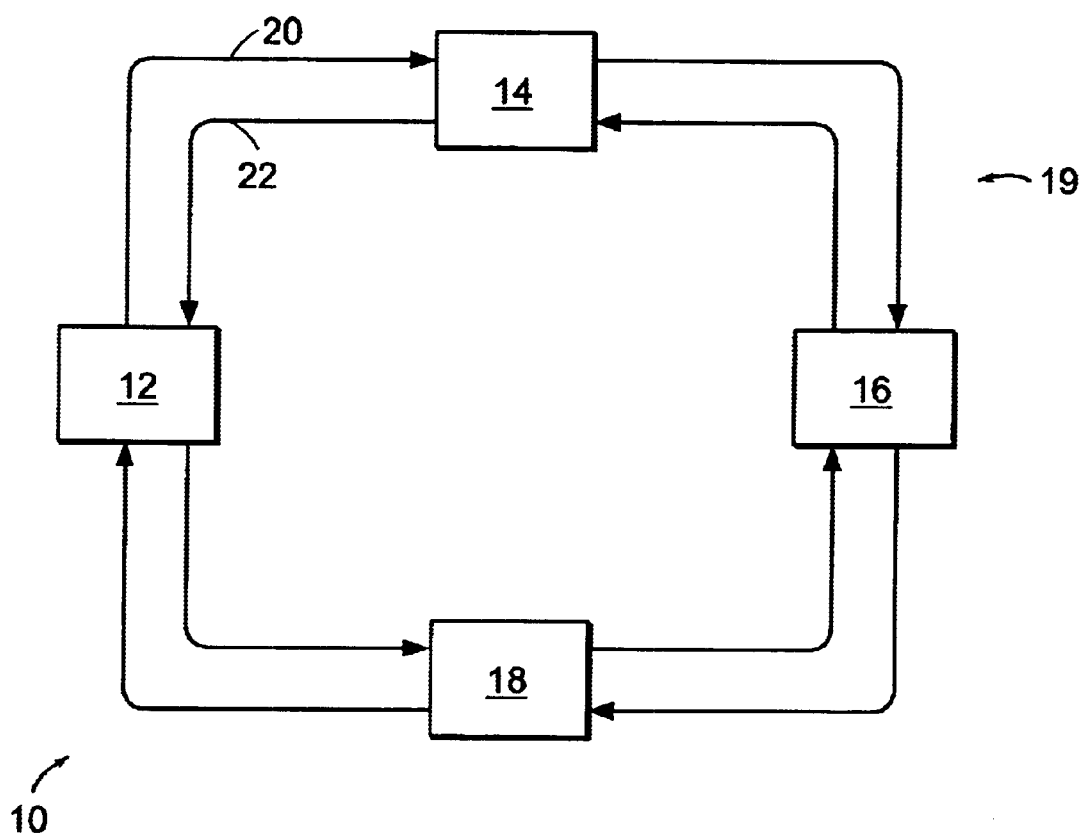
FIG. 1 shows a network in which a working fiber and a protection fiber connect a plurality of nodes into a ring.

A communication network 10 implementing the data protection method of the invention includes a plurality of nodes 12, 14, 16, 18 arranged in a ring 19, as shown in FIG. 1. Examples of such rings include SONET rings and WDM rings.

Within the ring 19, a particular node 12 is connected to adjacent nodes 14, 18 by a working channel 20 and a protection channel 22. For purposes of illustration, we adopt the convention that the working channel 20 carries a signal in a clockwise direction around the ring 19 and that the protection channel 22 carries the signal in a counterclockwise direction around the ring 19. The channel can be a transmission line such as an optical fiber. However, the channel can also be one of the many channels carried on a single optical fiber. This feature allows the communication network to carry out the data protection method of the invention on a single channel carried by an optical fiber without affecting all the other channels on the optical fiber.

Figure 2:
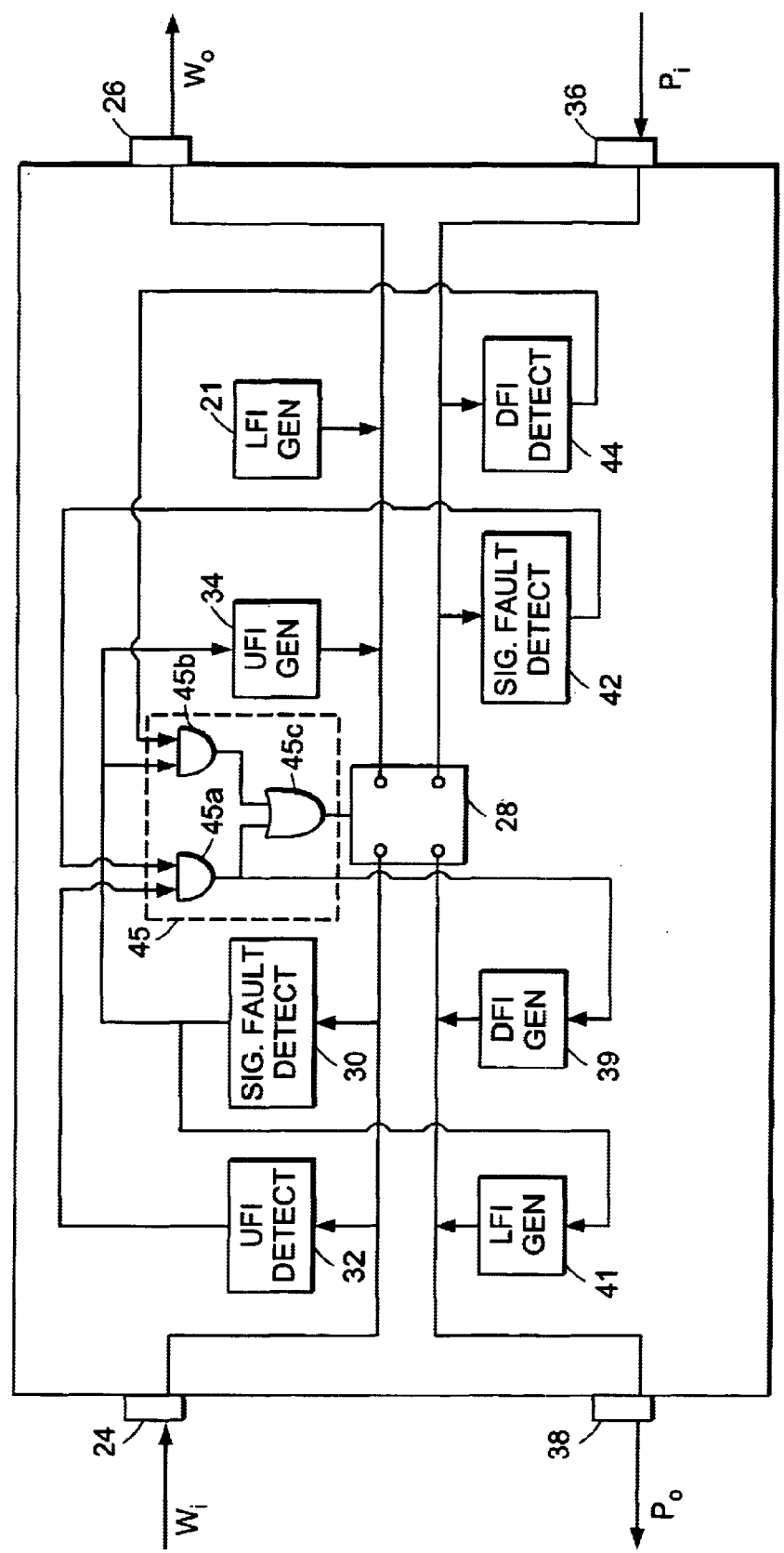
FIG. 2 is a typical node from the ring of FIG. 1 showing an internal architecture for protection of data following a signal fault on the working channel.

FIG. 2 shows a schematic illustration of a portion of the data protection system within a typical node. For the sake of simplicity in illustration and exposition, FIG. 2 shows only that portion of the data protection system associated with monitoring a signal on an inbound working channel Wi. In addition, because all the nodes 12, 14, 16, 18 have the same architecture, reference numerals for parts shown in FIG. 2 are used in connection with subsequent descriptions of the operation of each node.

The typical node shown in FIG. 2 includes a working channel input 24 that carries a signal normally routed to a working channel output 26 by the switch 28, shown here in its normal configuration. The working channel input 24 and the working channel output 26 are connected to an inbound working channel Wi and an outbound working channel Wo respectively. The working channel input 24 is monitored by a first signal fault detector 30 and by a UFI (upstream fault indication) signal detector 32. The working channel output 26 is in communication with a UFI generator 34 for generating a UFI signal to be detected by a UFI detector monitoring a working channel input 24 of an adjacent downstream node 14 on the working channel 20. Also in communication with the working channel output 26 is a first LFI (Local Fault Indication) generator 21. This first LFI generator 21 is used only in conjunction with the detection of a signal fault on the protection channel, as will be discussed below in connection with FIGS. 6 and 7.

The node also includes a protection channel input 36 that carries a signal normally routed to a protection channel output 38 by the switch 28. The protection channel input 36 and the protection channel output 38 are connected to an inbound protection channel Pi and an outbound protection channel Po respectively. A DFI (Downstream Fault Indication) generator 39 and a second LFI generator 41 are both in communication with the protection channel output 38 for sending a signal to an adjacent downstream node 18. A second signal fault detector 42 and a DFI (downstream fault indication) signal detector 44 monitor the protection channel input 36 for the presence of a signal fault or a DFI signal respectively.

The UFI detector 32, the DFI detector 44, and the first and second signal fault detectors 30, 42 cooperate to control the switch 28 through switch control elements 45. These switch control elements 45 are represented in FIG. 2 by a first AND gate 45a that is armed by the UFI detector 32 and triggered by the second signal fault detector 42; a second AND gate 45b that is armed by the first signal fault detector 30 and triggered by the DFI detector 44; and an OR gate 45c that trips the switch 28 in response to the output of either the first AND gate 45a or the second AND gate 45b.

The manner in which a ring of nodes having the architecture shown in FIG. 1 reconfigures the ring following a service disruption will be apparent from a detailed analysis of an example in which a disruption causes a signal fault on an inbound working channel leading to a node. The cause of the disruption is immaterial to the operation of the system. The disruption can arise from a fiber cut of one or both fibers that carry that channel, a degradation of a signal carried by one or more channels in one or both fibers, or from a disruption of an entire node. What is significant is that a signal fault in any fiber leading to any node in the ring initiates a sequence of events that inevitably results in the reconfiguration of the ring to avoid the disruption.

Figure 3A:
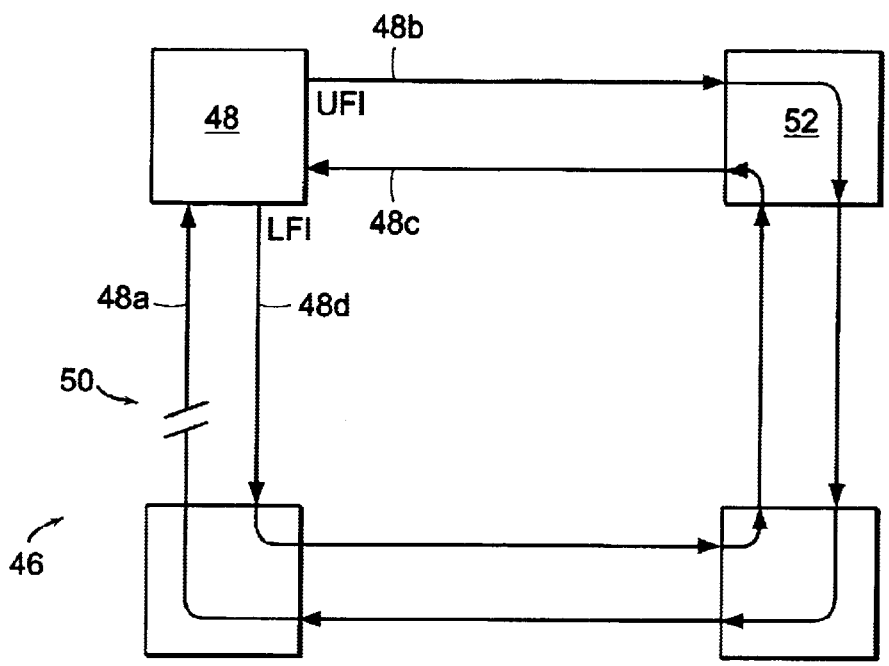
FIGS. 3A–3F show the state of a ring network at various times following a disruption in the network.

Referring now to FIG. 3A, a ring 46 includes a first node 48 in communication with an inbound working channel 48a, an outbound working channel 48b, an inbound protection channel 48c, and an outbound protection channel 48d. These channels are connected to the working channel input 24, the working channel output 26, the protection channel input 36, and the protection channel output 38 of the first node 48 respectively. A disruption 50 in the inbound working channel 48a results in the detection of a signal fault by the first node 48.

Referring back to FIG. 2, within the first node 48, the first signal fault detector 30 monitors its working channel input 24 for a signal fault. A signal fault can be a total loss of a signal or merely a degradation of a signal. In either case, if the first signal fault detector 30 detects a signal fault at the working channel input 24, it: instructs the UFI generator 34 to place a UFI signal on the working channel output 26, and instructs the second LFI generator 41 to place an LFI signal at the protection channel output, 38.

Referring back to FIG. 3A, because of the disruption 50 in the inbound working channel 48a, the UFI generator 34 of the first node 48 operates in the manner described above to place a UFI signal on its outbound working channel 48b and an LFI signal on its outbound protection channel 48d. This results in the UFI and LFI signals shown in FIG. 3A. Note that the UFI signal is now present on the signal entering a second node 52. The operation of this second node 52 is best understood with reference to FIG. 2.

Referring again to FIG. 2, the working channel input 24 is also monitored by the UFI detector 32. In response to the existence of a UFI signal on the working channel input 24, the UFI detector 32 outputs a signal arming the first AND gate 45a. In its armed state, the first AND gate 45a is prepared to place the switch 28 in its bridged state upon the occurrence of either a signal loss or an LFI signal on the protection channel input 36.

Figure 3B:
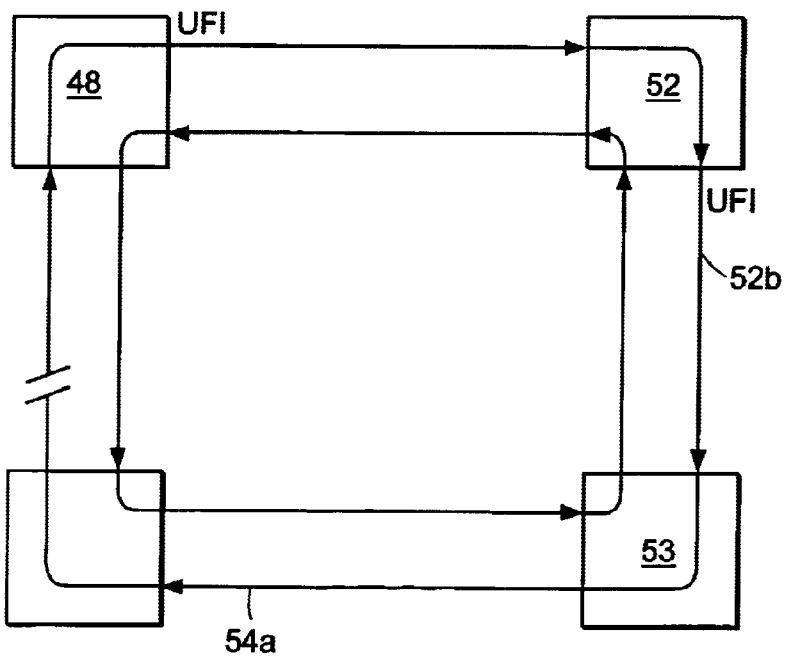

The second node 52 passes the signal present at its working channel input 24 to its working channel output 26. This places the ring 46 in the state shown in FIG. 3B, in which the UFI signal originally generated at the first node 48 is provided to the third node 53 by way of an outbound working channel 52b.

Figure 3C:
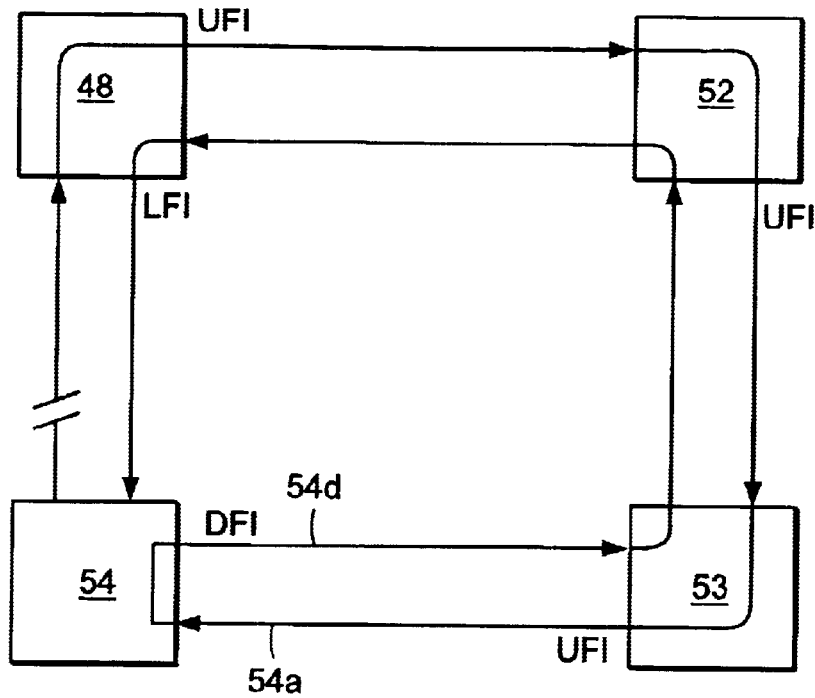

The third node 53 is identical to the second node 52 and reacts to the UFI signal in exactly the same manner as already described above. The third node thus provides the UFI signal, originally generated by the first node 48, to the working channel input of the fourth node 54, as shown in FIG. 3C.

The internal architecture of the fourth node 54 is identical to that of the second node 52. Consequently, the operation of the fourth node 54 in response to the UFI signal present on its inbound working channel 54a is identical to that described above in connection with the second node 52. The fourth node 54 therefore has within it a first AND gate 45a that has been armed by its UFI detector 32 in response to the UFI signal now present on the inbound working channel 54a.

Figure 4:
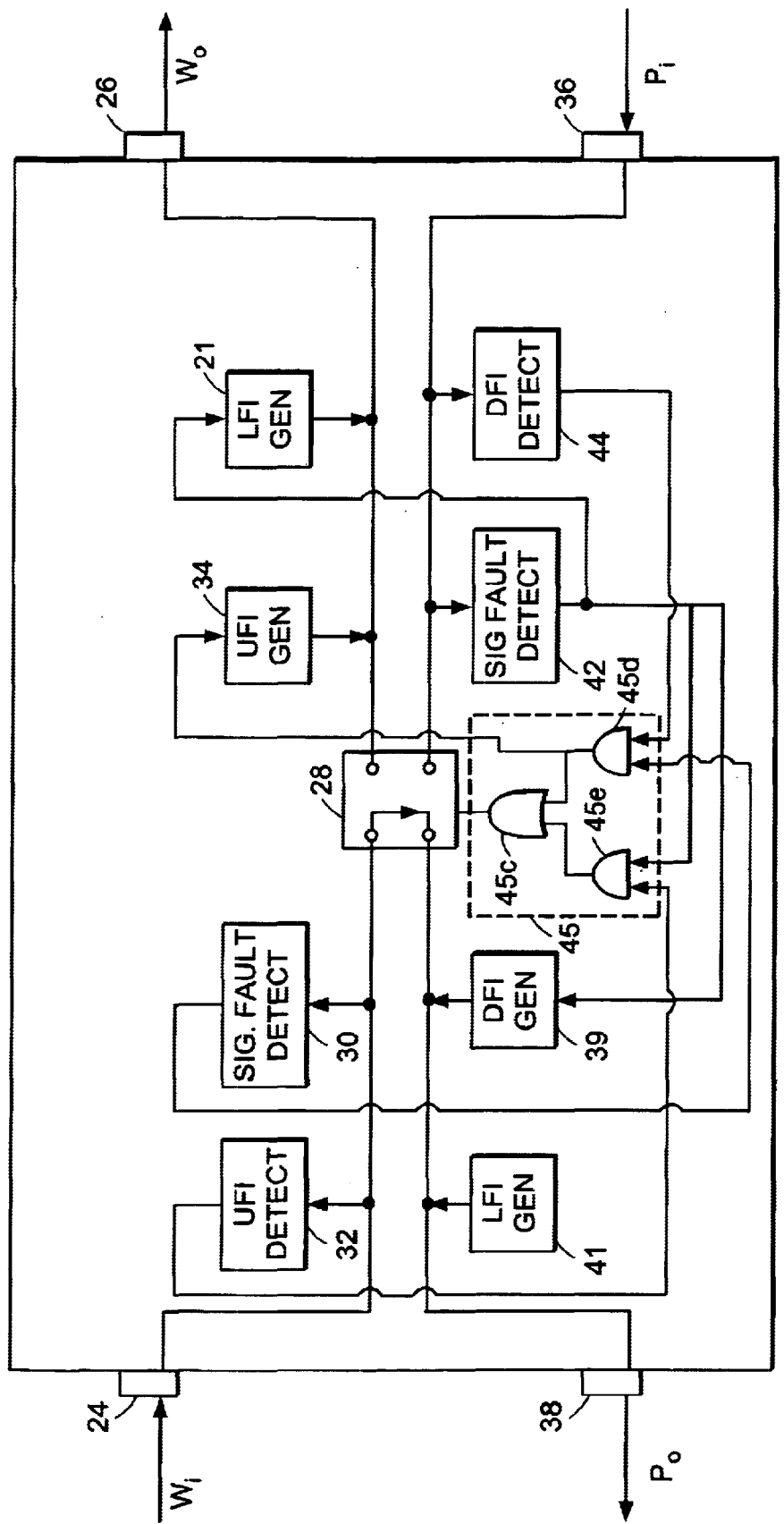
FIG. 4 shows the node of FIG. 2 redirecting traffic from an inbound protection channel to an outbound working channel.

Consistent with the foregoing discussion of the operation of the first signal fault detector 30, the first node 48, in response to the existence of a signal fault at its working channel input 24, instructed its second LFI generator 41 to place an LFI signal at its protection channel output 38. This LFI signal is therefore present on the protection channel input 36 of the fourth node 54. Because it has been armed by the UFI detector 32, the first AND gate 45a generates a signal that passes through the OR gate 45c to place the switch 28 in a bridged state, as shown in FIG. 4. In this state, the switch 28 redirects traffic on the inbound working channel 54a to the outbound protection channel 54d. In addition, the signal from the first AND gate 45a causes the DFI generator 39 to place a DFI signal on the protection channel output. This places the ring 46 in the state shown in FIG. 3C.

Depending on the location of the fault, the LFI signal may be detected by signal fault detector 30 or signal fault detector 42. if both the protection channel and the working channel are cut, or if a node fails altogether, it may be impossible for a node to detect an LFI signal. In order to extend the operation of the data protection system to such cases, it is preferable for the fourth node 54 to treat a loss signal in the same, manner as an LPI signal.

Figure 3D:
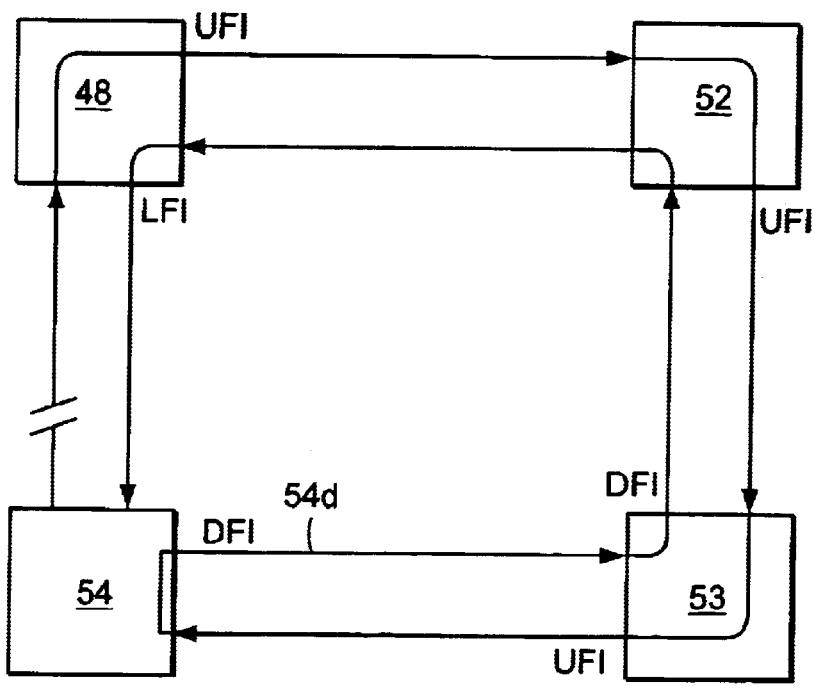
Figure 3E:
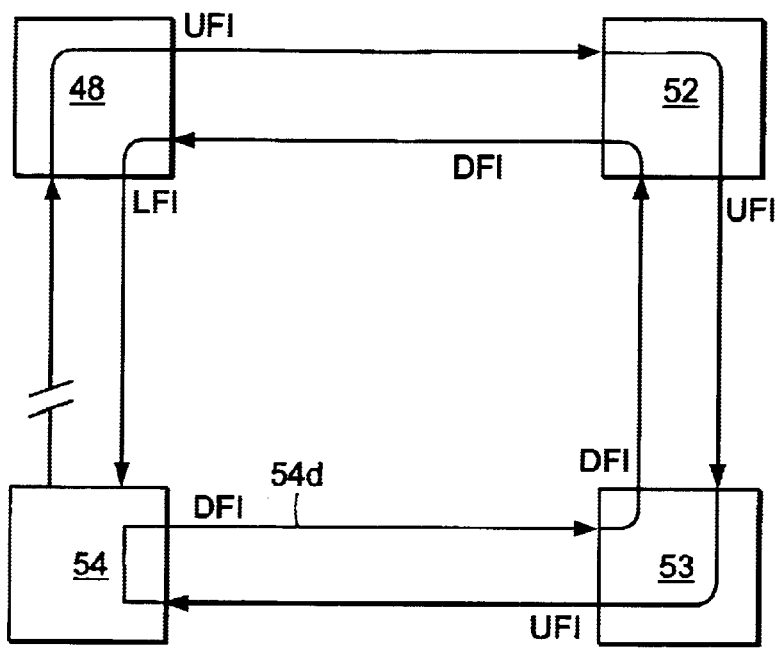

The DFI signal present on the outbound protection channel 54d associated with the fourth node 54 now propagates back through the third node 53, as shown in FIG. 3D, and through the second node 52, as shown in FIG. 3E. Because neither the third node 53 nor the second node 52 ever transmitted an LFI signal out their respective protection channel outputs 38, neither of those nodes ever armed their respective DFI detectors 44. As a result, the DFI signal is passed unimpeded to.the protection channel input of the first node 48.

Referring back to FIG. 2, the first node 48 did send an LFI signal on its protection channel output 38. As a result, the first signal fault detector 30 of the first node 48 armed the second AND gate 45b of the first node 48. This second AND gate is therefore ready to trigger the switch 28 upon receipt, by the first node 48, of a DFI signal on the protection channel input 36. This DFI signal is provided by the second node 52, as shown in FIG. 3E.

Figure 3F:
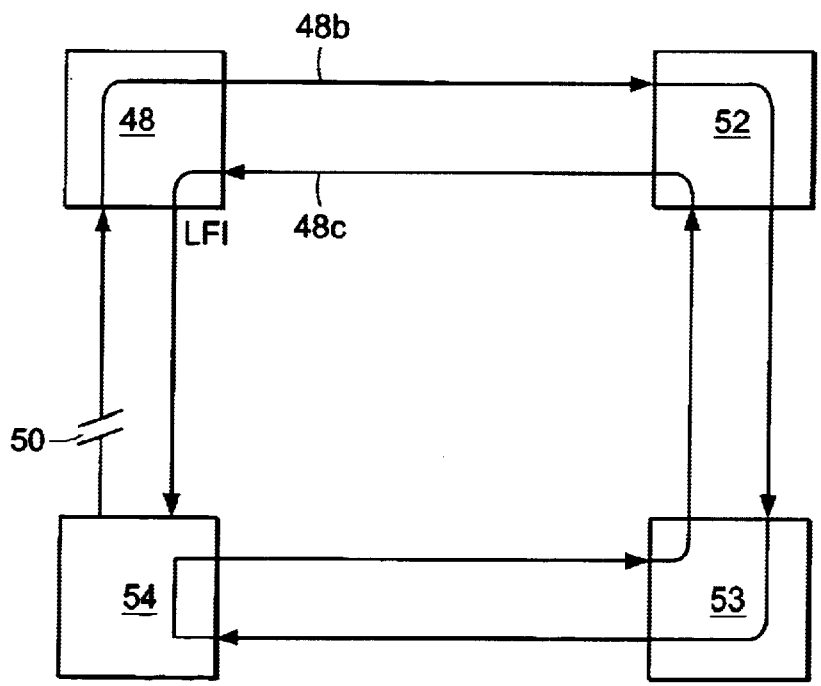

Upon receipt of this DFI signal, the second AND gate 45b of the first node 48 places the switch 28 in its bridged state, as shown in FIG. 4. This places the ring 46 in the state shown in FIG. 3F, in which traffic entering the first node 48 on its inbound protection channel 48c is routed to its outbound working channel 48b, thereby reconfiguring the ring 46 to avoid the disruption 50.

It is apparent that since only one node in the ring 46 detects the fault on its inbound working channel and that only one node in the ring detects the LFI signal (or a loss of signal) on its inbound protection channel. As a result, only two nodes can be in a position to form a bridge. These two nodes are inevitably those nodes that are adjacent to the disruption 50.

In the preferred embodiment, the LFI, DFI, and UFI signals are encoded in an overhead byte of the frame overhead associated with transmission of data. For example, in the case of a SONET ring, these signals can be sent over the Z4 or V4 bytes of the SONET path overhead.

Figure 5:
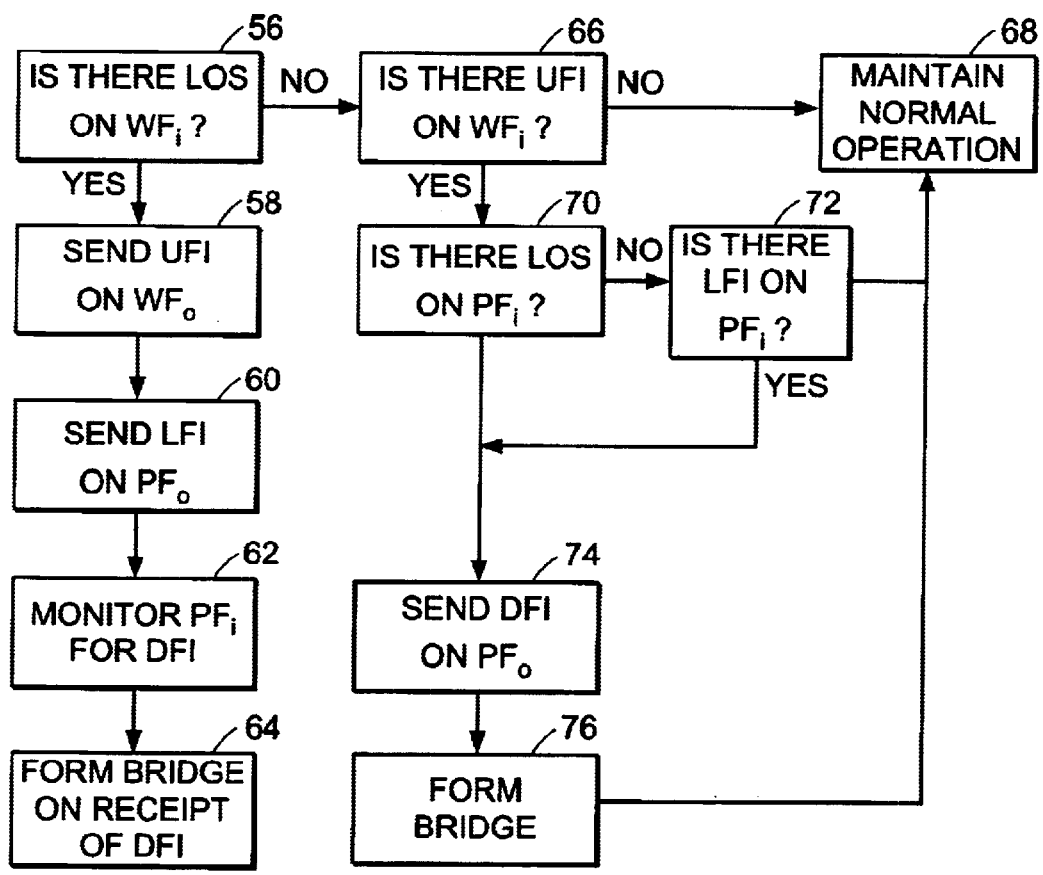
FIG. 5 is a flow chart illustrating the logic followed by the node of FIG. 2 in implementing the data protection method of the invention.

FIG. 5 is a flow chart summarizing the operation of a typical node in the data protection method of the invention. As shown in FIG. 5, a node first checks to see if there exists a signal fault on its inbound working channel (step 56). If there is, the node transmits a UFI on the outbound working channel (step 58) and sends an LFI signal on its outbound protection channel (step 60). The node then monitors its inbound protection channel for the presence of a DFI signal (step 62). Upon receipt of a DFI signal, the node then forms a bridge, thereby routing traffic from its inbound protection channel to its outbound working channel (step 64).

If there is no fault present on its inbound working channel, the node checks to see if there is a UFI on its inbound working channel (step 66). If there is no UFI on its inbound working channel, then the ring is operating normally and no further action need be taken (step 68). However, if there is a UFI on its inbound working channel, the node must determine whether it is to form a bridge.

To determine whether it is to form a bridge, the node examines its inbound protection channel to determine whether there is either a loss of signal (step 70) or a signal fault (step 72). If neither of these are present on its inbound protection channel, the node recognizes that there is no need for it to form a bridge (step 68). If either a loss of signal or a signal fault is present on its inbound protection channel, the node sends a DFI signal on its outbound protection channel to signal whichever node initiated the data protection process that one bridge has been formed and that it too should form a bridge (step 74). At the same time, or shortly thereafter, the node forms a bridge, thereby routing traffic from its inbound working channel to its outbound protection channel (step 76).

The foregoing discussion describes the structure and operation of the system in connection with a disruption in the working channel. The operation of the system in connection with a disruption of a signal on the protection channel proceeds in an analogous manner, as indicated by the flow chart of FIG. 6.

Figure 6:
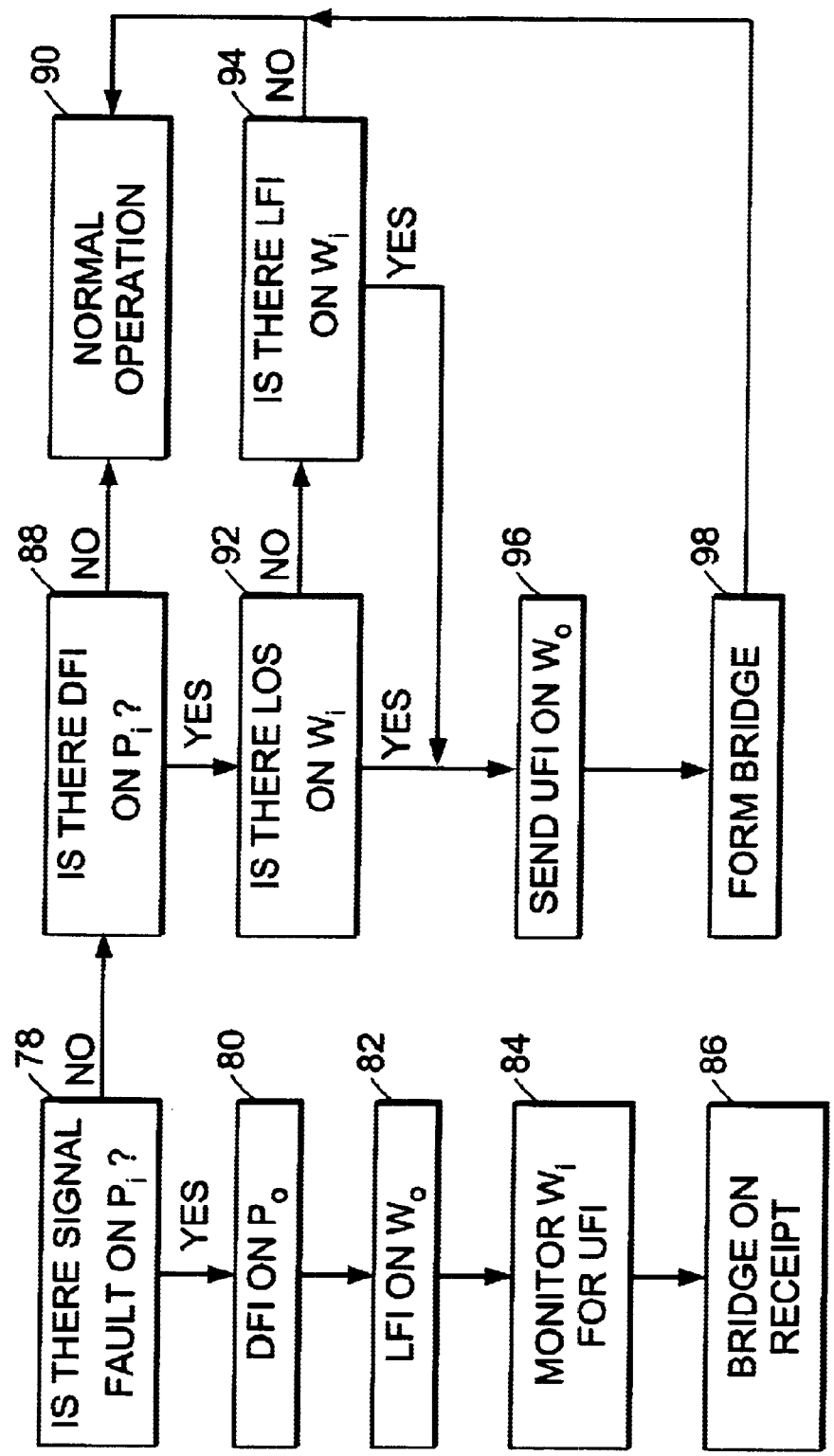
FIG. 6 is the node of FIG. 2 showing the internal architecture for protection of data following a signal fault on the protection channel.

Referring to FIG. 6, when a first node detects a signal fault on its inbound protection channel (step 78), it sends a DFI signal on its outbound protection channel (step 80) and an LFI signal on its outbound working channel (step 82). The DFI signal propagates around the ring in the same manner that the UFI signal propagated around the ring when the signal fault was on the inbound working channel instead of the inbound protection channel. The first node then waits for a UFI signal on its working channel (step 84) and, upon receipt of such a signal, forms a bridge (step 86).

A second node that does not detect a signal fault on its inbound protection channel monitors its inbound protection channel for a DFI signal indicating a fault somewhere on the protection channel (step 88). If it detects no such DFI signal, the second node remains in its normal operating state (step 90). If it does detect such a signal, it must then determine whether it should form a bridge. To do so, the second node monitors the inbound working channel for either a loss of signal (step 92) or the presence of the LFH signal generated by the first node (step 94). If neither of these is present, the second node recognizes that it need not form a bridge, and it therefore remains in its normal operating mode (step 90). However, if the second node detects either a loss of signal or an LFI signal on the inbound working channel, it sends a UFI signal on its outbound working channel (step 96) and forms a bridge (step 98). It is this UFI signal that triggers the formation of a bridge by the first node (steps 84 and 86).

Figure 7:
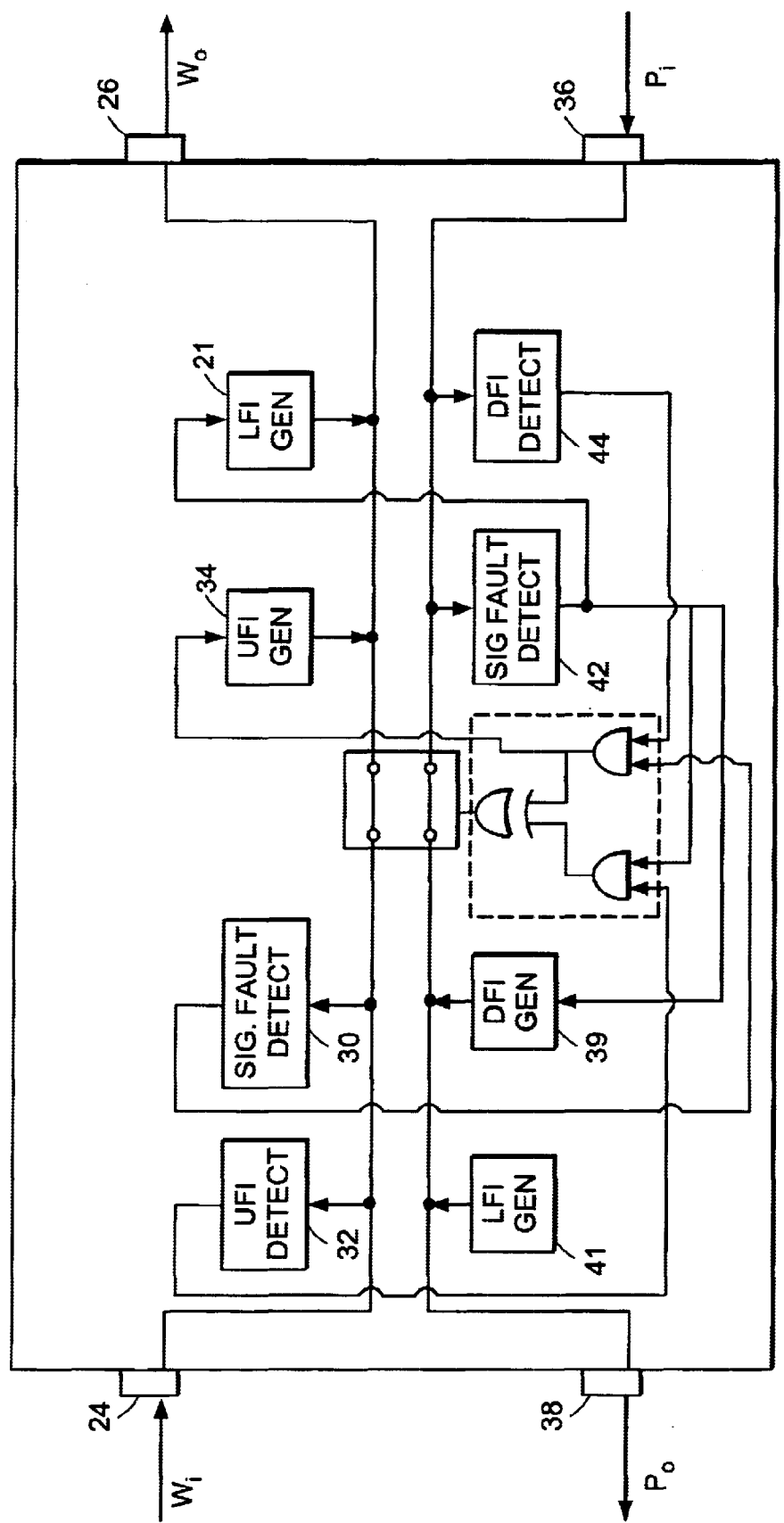
FIG. 7 is a flow chart illustrating the logic followed by the node of FIG. 6 in implementing the data protection method of the invention.

FIG. 7 shows the node in FIG. 2 but with only those interconnections between components that relate to the operation of the data protection system when a disruption is present on the protection channel instead of on the working channel. In practice, the interconnections shown in FIG. 7 and FIG. 2 are present on a typical node at the same time.

As shown in FIG. 7, the second signal fault detector 42 monitors the protection channel input 36 for the occurrence of a fault If the second signal fault detector 42 detects a fault on the inbound protection chancel it causes the first LFT generator 21 to send an ILO signal on the outbound working channel and the DFI generator 39 to send a DPI signal on the outbound protection channel. In addition, the second signal fault detector arms a third AND gate 45e to be ready to trip the switch 28 upon receipt of detection of a UPI signal on the inbound working channel by the UPI detector 32.

The first signal fault detector 30 monitors the inbound working channel for the presence of a signal fault. If a signal fault exists on the inbound working channel, the first signal fault detector arms a fourth AND gate 45d. Meanwhile, a DFI detector waits for a DFI signal on the inbound protection channel. As long as no DFI signal is present, the switch 28 is in its normal state. However, upon receipt of a DFI signal, the DFI detector signals the armed fourth AND gate 45d. The fourth AND gate 45c then causes the UFI generator 34 to send a UFI signal on the outbound working channel and also causes the switch 28 to trip and form a bridge.

The data protection system of the invention thus includes a system for protection of data on the working channel operating in parallel with an analogous system for the protection of data on the protection channel. In addition, because the ring 46 has the same configuration as a UPSR, the conventional UPSR data protection system can operate in parallel with the data protection system of the invention.

Having described the invention and a preferred embodiment thereof, what we claim as new and secured by letters patent is:

1. A method for reconfiguring a ring having a plurality of nodes connected by first and second channels, said method comprising:

sending, from a first node to a second node by way of said fist channel, a first fault signal indicative of a signal fault, said first and second nodes being selected from said plurality of nodes, said first fault signal causing an armed state at said second node and at another node being seemed from said plurality of nodes;

detecting, at said second node by way of said second channel, information indicative of said signal fault;

in response to said aimed state at said second node and in response to said information indicative of said signal fault, forming a first bridge at said second node;

sending an acknowledgment signal from said second node to said first node by way of said second channel; and in response to said acknowledgement signal, forming a second bridge at said first node.

2. The method of claim 1 wherein detecting said information comprises detecting a loss of signal on said second channel.

3. The method of claim 1 wherein said first node transmits, by way of said second channel, a second fault signal indicative of said signal fault, and detecting said information comprises detecting said second fault signal.

4. The method of claim 1 further comprising routing said first fault signal and said acknowledgement signal through a third node selected from said plurality of nodes.

5. The method of claim 1 wherein forming said second bridge comprises directing data traffic inbound to said first node on said second channel outbound from said first node on said first channel.

6. The method of claim 5 wherein forming said first bridge comprises directing data traffic inbound to said second node on said first channel outbound from said second node on said second channel.

7. The method of claim 1 wherein forming said first bridge comprises directing data traffic inbound to said second node on said first channel outbound from said second node on said second channel.

8. The method of claim 1 further comprising detecting said signal fault.

9. The method of claim 8 wherein detecting said signal fault comprises detecting a loss of signal on said first channel.

10. The method of claim 8 wherein detecting said signal fault comprises detecting a degradation of a signal on said first channel.

11. The method of claim 1 flyer comprising selecting said ring to be a SONET ring.

12. The method of claim 1 further comprising selecting said ring to be a WDM ring.

13. The method of claim 11 wherein sending said first fault signal comprises encoding said fault signal on frame header.

14. The method of claim 13 wherein encoding said first fault signal on said frame header comprises encoding said first fault signal in a byte selected from group consisting of a V4 byte and a Z4 byte.

15. A switching apparatus for a network node on a ring having a plurality of network nodes connected by first and second channels, said switching apparatus comprising a bridge-request generator for generating, in response to a signal fault on said first channel a bridge-request signal for transmitting to a second node by way of said first channel, said second node being selected from said plurality of nodes, said bridge-request signal causing an armed state at said second node and at another node being selected from said plurality of nodes;

an acknowledgement detector for detecting an acknowledgement signal on said second channel from said second node, said acknowledgement signal being generated in response to said armed state at said second node; and a switch for switching between a first position in which said first channel is disconnected from said second channel and a second position in which said first channel is connected to said second channel, said switch transitioning from said first position to said second position in response to said acknowledgmnent signal.

16. The switching apparatus of claim 15 wherein said bridge-request generator comprises means for incorporating said bridge-request signal in a header of a data frame.

17. The switching apparatus of claim 15 wherein said ring is a SONET ring.

18. The switching apparatus of claim 15 wherein said ring is a WDM ring.

19. The switching apparatus of claim 15 wherein, in said second position, said switch directs traffic inbound to said switching apparatus from said second channel outbound on said first channel.

20. The switching apparatus of claim 15 further comprising a signal fault detector for detecting a signal fault in said first channel.

21. The switching apparatus of claim 20 wherein said signal fault detector comprises means for detecting a loss of signal on said first channel.

22. The switching apparatus of claim 20 wherein said signal fault detector comprises means for detecting a degradation of a signal on said first channel.

23. A switching apparatus for a network node on a ring having a plurality of network nodes connected by first and second channels, said switching apparatus comprising a bridge-request monitor for detecting a bridge-request signal on said first channel, said bridge-request signal causing an armed state at said switching apparatus and at another switching apparatus for another node being selected from said plurality of nodes;

a first fault detector for detecting information indicative of a signal fault on said second channel; and a switch for switching between a first position in which said first channel is disconnected from said second channel and a second position in which said first channel is connected to said second channel, said switch transitioning from said first position to said second position in response to the detection of said information indicative of a signal fault on said second channel and said armed state at said switching apparatus.

24. The switching apparatus of claim 23 further comprising an acknowledgemient signal generator in communication with said second channel, said acknowledgement signal generator transmitting an acknowledgement signal on said second channel in response to the detection of said information indicative of a signal fault on said second channel and said bridge-request signal.

25. The switching apparatus of claim 23 wherein said first fault detector is cored to detect a loss of signal on said second channel.

26. The switching apparatus of claim 23 wherein said fault detector is configured to detect a fault signal on said second channel.

27. The switching apparatus of claim 23 wherein said first fault detector is configured to detect degradation of a signal on said second channel.

28. The switching apparatus of claim 23 wherein, in said second position, said switch directs traffic inbound to said switching apparatus from said first channel outbound on said second channel.

29. The switching apparatus of claim 23 wherein said ring is a SONET ring.

30. The switching apparatus of claim 23 wherein said ring is a WDM ring.

31. The switching apparatus of claim 24 wherein said acknowledgment signal generator comprises means for placing said acknowledgement signal in a frame header.

* * * * *

UNITED STATES PATENT AND TRADEMARK OFFICE
CERTIFICATE OF CORRECTION

PATENT NO.   : 6,622,258 B1
DATED        : September 16, 2003
INVENTOR(S)  : Lee et al.

It is certified that error appears in the above-identified patent and that said Letters Patent is hereby corrected as shown below:

<u>Column 8,</u>
Line 8, "fist" should read -- first --.
Line 12, "seemed" should be -- selected --.
Line 67, a comma after "channel"

<u>Column 10,</u>
Line 23, "cored" should be -- configured --.

Signed and Sealed this

Second Day of December, 2003

JAMES E. ROGAN
*Director of the United States Patent and Trademark Office*